(12) United States Patent
Copenhagen et al.

(10) Patent No.: US 8,010,327 B2
(45) Date of Patent: Aug. 30, 2011

(54) COMPOSITE ASSETS FOR USE IN MULTIPLE SIMULATION ENVIRONMENTS

(75) Inventors: Keith Copenhagen, Orinda, CA (US); David Nielsen, Alameda, CA (US); Steven Pollini, Alameda, CA (US)

(73) Assignee: Total Immersion Software, Inc., Hampton, VA (US)

( * ) Notice: Subject to any disclaimer, the term of this patent is extended or adjusted under 35 U.S.C. 154(b) by 642 days.

(21) Appl. No.: 12/150,323

(22) Filed: Apr. 25, 2008

(65) Prior Publication Data

US 2009/0271160 A1    Oct. 29, 2009

(51) Int. Cl.
*G06G 7/48* (2006.01)
(52) U.S. Cl. ......................................................... 703/6
(58) Field of Classification Search .................. 703/6
See application file for complete search history.

(56) References Cited

U.S. PATENT DOCUMENTS

| | | | | | |
|---|---|---|---|---|---|
| 5,825,651 A | * | 10/1998 | Gupta et al. | | 700/103 |
| 5,826,065 A | * | 10/1998 | Hinsberg, III et al. | | 717/104 |
| 5,907,494 A | * | 5/1999 | Dangelo et al. | | 703/1 |
| 5,910,903 A | * | 6/1999 | Feinberg et al. | | 703/6 |
| 7,292,941 B1 | * | 11/2007 | Rahmes et al. | | 702/5 |
| 7,512,526 B2 | * | 3/2009 | Allen et al. | | 703/2 |
| 7,571,146 B2 | * | 8/2009 | Dalton | | 706/45 |
| 7,599,870 B2 | * | 10/2009 | Merkoulovitch et al. | | 705/36 R |
| 2002/0128806 A1 | | 9/2002 | Anderson et al. | | |
| 2004/0030571 A1 | | 2/2004 | Solomon | | |
| 2006/0075391 A1 | * | 4/2006 | Esmonde et al. | | 717/136 |
| 2007/0260436 A1 | * | 11/2007 | Couretas et al. | | 703/6 |

OTHER PUBLICATIONS

International Search Report and Written Opinion dated May 20, 2009 in PCT Application No. PCT/US09/40387.
World War II Online, Wikipedia entry, accessed on Aug. 21, 2009 at http://en.wikipedia.org/wiki/World_War_II_Online.
International Preliminary Report on Patentability (Form PCT/IPEA/409) for International Application No. PCT/US09/40387 dated Sep. 21, 2010.
ODF File Extension-Open. ODF files, http://www.fileinfo.com/extension/ODF, Nov. 1, 2010.
Battlezone II: Combat Commander—Wikipedia, the free encyclopedia, http://en.wikipedia.org/wiki/Battlezone_II:_Combat_Commander Oct. 29, 2010.

* cited by examiner

*Primary Examiner* — Dwin M Craig
(74) *Attorney, Agent, or Firm* — Knobbe Martens Olson & Bear LLP

(57) ABSTRACT

One of a plurality of description elements for a scenario is attached to a composite asset. The composite asset comprises one or more data sets. Each data set is associated with a simulation. And, a simulation asset is generated for a scenario based at least in part on the composite asset.

21 Claims, 10 Drawing Sheets

COMPOSITE ASSETS FOR USE IN MULTIPLE SIMULATION ENVIRONMENTS

BACKGROUND OF THE INVENTION

Emergency workers, first responders, police, and military personnel are increasingly trained using computer simulations of real world scenarios. In order to effectively expose workers to the kinds of complex situations encountered in emergency, disaster, or military scenarios, the simulations must be extremely rich in detail. A helicopter pilot, a person on foot, and a truck driver each experience a given scenario's objects from different perspectives and focus with different situational details being relevant. However, a given scenario object also needs to be consistent for each of the different actors in the scenario. Further, during the definition of a scenario, it would be error prone and labor intensive to require each object to be repeatedly specified in terms of relevant perspective/function/operation/level of detail information for each actor's simulation of the scenario. In addition, there may need to be variations to a given object—for example, a truck can be expressed as a cockpit for the truck driver's perspective in one simulation in the scenario, while a larger visual shape for the person-on-foot perspective in another simulation in the scenario, and as an icon or chit in the city manager's perspective in a third simulation in the scenario.

BRIEF DESCRIPTION OF THE DRAWINGS

Various embodiments of the invention are disclosed in the following detailed description and the accompanying drawings.

DETAILED DESCRIPTION

Figure 1:
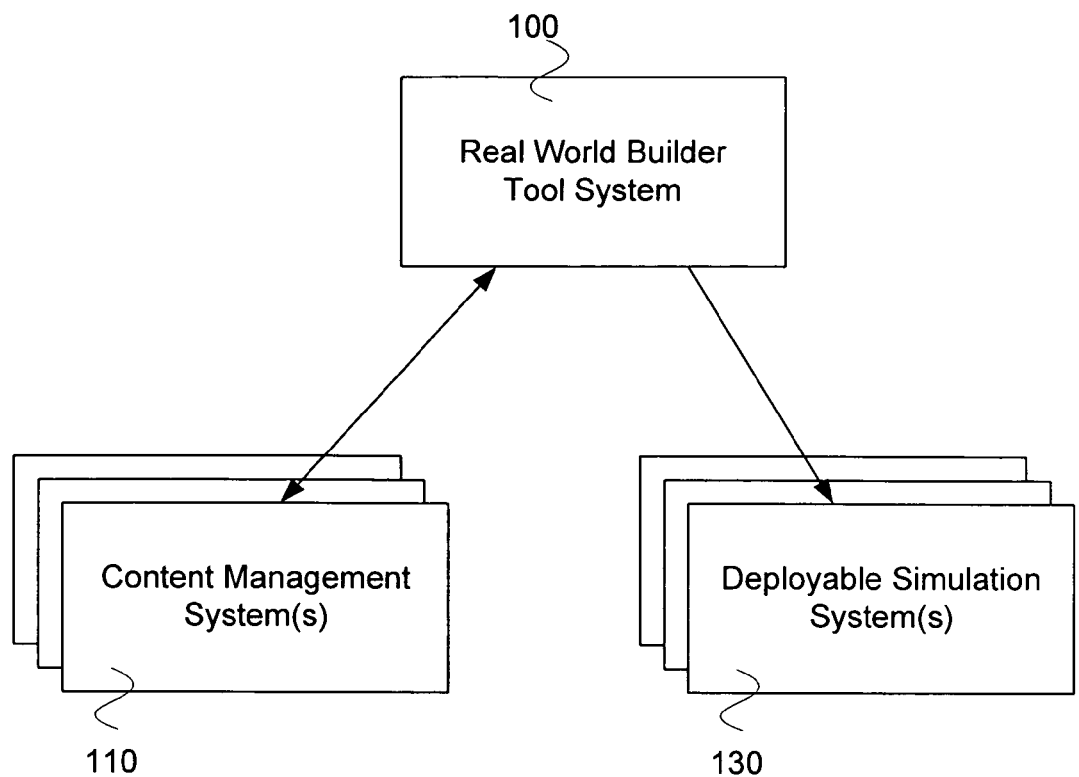
FIG. 1 is a block diagram illustrating an embodiment of a system including composite assets for use in multiple simulation environments.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composite assets for use in multiple simulation environments is disclosed. Integration is performed using one or more tools (e.g., a tool referred to as a Real World Builder or as RealWorld™ Builder). The tool first combines multiple simulation-specific perspectives of a scenario element into a single configurable composite asset. Prior to use in scenarios, composite assets can be appropriately configured. In other words, composite assets are created with data for use in multiple simulation environments and configured when creating scenarios to support multiple simulation perspectives. Second, the tool configures composite assets according to a scenario description. The scenario can contain elements that are only germane to a single simulation perspective or can be common across multiple or all simulation perspectives. Third, the tool generates multiple perspective-specific simulations of the scenario by decomposing the composite assets appropriately to support the desired simulation environment. Creating and editing scenarios with composite assets rather than repeatedly editing the simulation-specific environment assets ensures consistency between assets, their expressions and behaviors in different simulation environments and reduces the amount of work necessary to produce the multiple simulations for a given scenario.

In some embodiments, a scenario comprises a military mission (e.g., a hostage rescue, an assault on a building, an invasion of a port, etc.). The scenario will be rehearsed using simulations from a number of perspectives. Each of those simulations, though, will reflect the shared situational elements from a variety of perspectives (e.g., trucks, planes, personnel, communication equipment, etc.). Each simulation considers different detail and/or information appropriate or relevant. For example, a simulation of a helicopter pilot's experience will contain high resolution of detail, both visual and functional, of the helicopter instrumentation and a low resolution of detail of ground elements (e.g., such as a person's clothing), whereas a simulation of the ground person's experience will contain no information of a helicopter's instrumentation panel, contain some detail of the exterior appearance and location of the helicopter, and high detail as to the ground person's clothing, what is in their pockets and pack, etc. When defining the scenario, it would be prohibitively cumbersome for the author to work with multiple client-specific simulation representations of a given asset. Further, it is important to have consistency of the assets between the different scenarios. For example, the helicopter's markings and flight path should be the same in both the pilot's simulation and the ground person's simulation and should have the same capabilities (e.g., range, armament, payload capacity, etc.)

In some embodiments, emergency or disaster (e.g., flood, earthquake, hurricane, fire, or other) scenarios include simulations for emergency workers, pilots, drivers, health care providers, fire personnel, police, national guard, city management, etc. Emergency scenario assets include but are not limited to individual workers, trucks, cars, ambulances, fire equipment, helicopters, planes, boats, hospitals, doctors, bulldozers, snow removal equipment, situational awareness tools, etc.

FIG. 1 is a block diagram illustrating an embodiment of a system including composite assets for use in multiple simulation environments. In the example shown, Real World Builder Tool System 100 comprises software application tools able to perform functions including a Composite Asset Editing Tool, a Scenario Authoring Tool, and a Simulation Generation Tool. The Composite Asset Editor combines the simulation assets from one or more Content Management Systems 110 into a composite asset and saves those composite assets. In some embodiments, the composite assets are stored in a content management system such as one of the content management systems 110. The Scenario Authoring Tool combines composite assets with Environmental Data from one or more Content Management Systems 110 and a Scenario Description, also stored in a content management system such as one of the content management systems 110, to create an authored scenario description. A simulation generation tool creates a set of Deployable Simulation Systems 130 using stored executables in a content management system such as Content Management Systems 110 with a unified scenario based on the authored scenario description. Deployable Simulation Systems 130 comprise systems to simulate a scenario from one or more different perspectives. In various embodiments, simulations are rendered from the perspective of a pilot (e.g., an A10 pilot or a helicopter pilot), a truck driver, a radar operator, a hospital doctor, a ground person, or any other appropriate simulation perspective. In some embodiments, communication between Deployable Simulation Systems 130 is enabled using voice over internet protocol (VoIP) or other communication protocol(s) enabling partial or complete concurrency between simulations depicting a single scenario. For example, event(s), position(s), and/or action(s), can be communicated between simulations so that the event(s), position(s), and/or action(s) can be commonly experienced, taking into account a given simulation's perspective (e.g., a helicopter's or plane's position may alter changing a ground person's perception of the helicopter's or plane's position from the ground).

Real World Builder Tool System 100 thereby eliminates repetition of editing a given asset for different simulation environments and mitigates potential consistency issues arising from developing an asset for different simulation environments that might arise if the given asset was edited differently for one simulation environment as compared to another simulation environment where both simulation environments are simulating the same scenario.

Environmental Data comprises a set of terrain data to be used as the underlayment for a simulation. The terrain data maps the range of terrain types to one or more composite assets (e.g., to include appropriate details for many Deployable Simulation Systems 130) via the Real World Builder Tool System 100. In various embodiments, terrain data includes land elevation data, buildings and cultural feature data, land use data, transportation vector data, or any other informing terrain data. In various embodiments, a cultural feature includes a building, a fountain, a stadium, a neighborhood, or any other appropriate cultural feature. In various embodiments, a transportation vector includes a road, a waterway, a rail, shipping lane or any other appropriate vector data.

In various embodiments, inputs (e.g., asset(s), scenario description(s), simulation executable(s), environmental data, composite asset(s), etc.) for Real World Builder Tool System 100 are input using files, streams, received at an input interface, via a network, from a repository or any other appropriate manner of receiving input.

Figure 2:
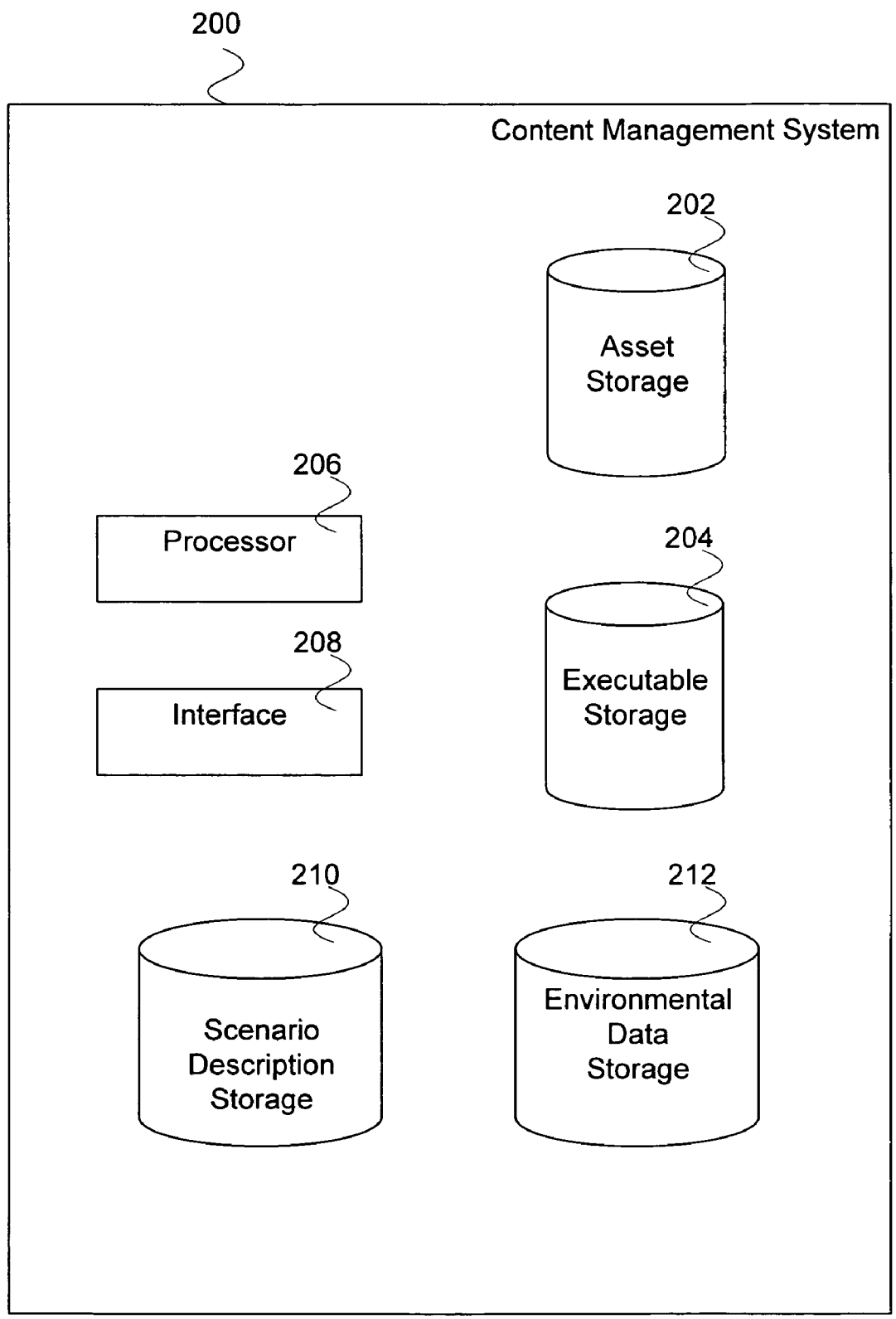
FIG. 2 is a block diagram illustrating an embodiment of a content management system.

FIG. 2 is a block diagram illustrating an embodiment of a content management system. In some embodiments, content management system 200 is used to implement one or more content management system(s) 110 of FIG. 1. In the example shown, content management system 200 of FIG. 2 comprises asset storage 202, executable storage 204, processor 206, interface 208, scenario description storage 210, and environmental data storage 212. Asset storage 202 stores simulation assets. In various embodiments, assets for a given simulation are generated or developed by hand or are extracted from a simulation system and stored in asset storage 202. Assets include appropriate model data and attributes that are configurable or fixed for a given simulation environment. For example, a truck asset has data for representing the model structure and appearance along with fixed attributes of tire size, engine type, height, width, etc. and configurable attributes of number of passengers, amount of fuel in gas tank, starting location, maximum acceleration and speed, etc. Executable storage 204 stores simulation executable code. Scenario Description Storage 210 stores a description of a scenario that includes a description of the "who, what, when, where, why, and how" of a scenario that is desired to be simulated in simultaneously in multiple simulations. In some embodiments, the scenario description comprises a plurality of description elements for the scenario. In various embodiments, a description element comprises one of the following: an area of operation, a list of teams, a list of actors, a team, an actor, a piece of equipment, an operation time, a piece of meteorology information, a scenario intent, a scenario goal, a scenario situation, a piece of scenario intelligence, or any other appropriate element of a description of a scenario. Environmental data storage 212 stores a description of the environment with detail appropriate for multiple simulations. Content management system 200 communicates with a real world builder (e.g., RealWorld Builder 100 of FIG. 1) using interface 208. Processor 206 executes commands received from Interface 208 and accesses content stored in the repositories of Content Management system 200 including Asset Storage 202, Executable Storage 204, Scenario Description Storage 210, and Environmental 212.

Figure 3A:
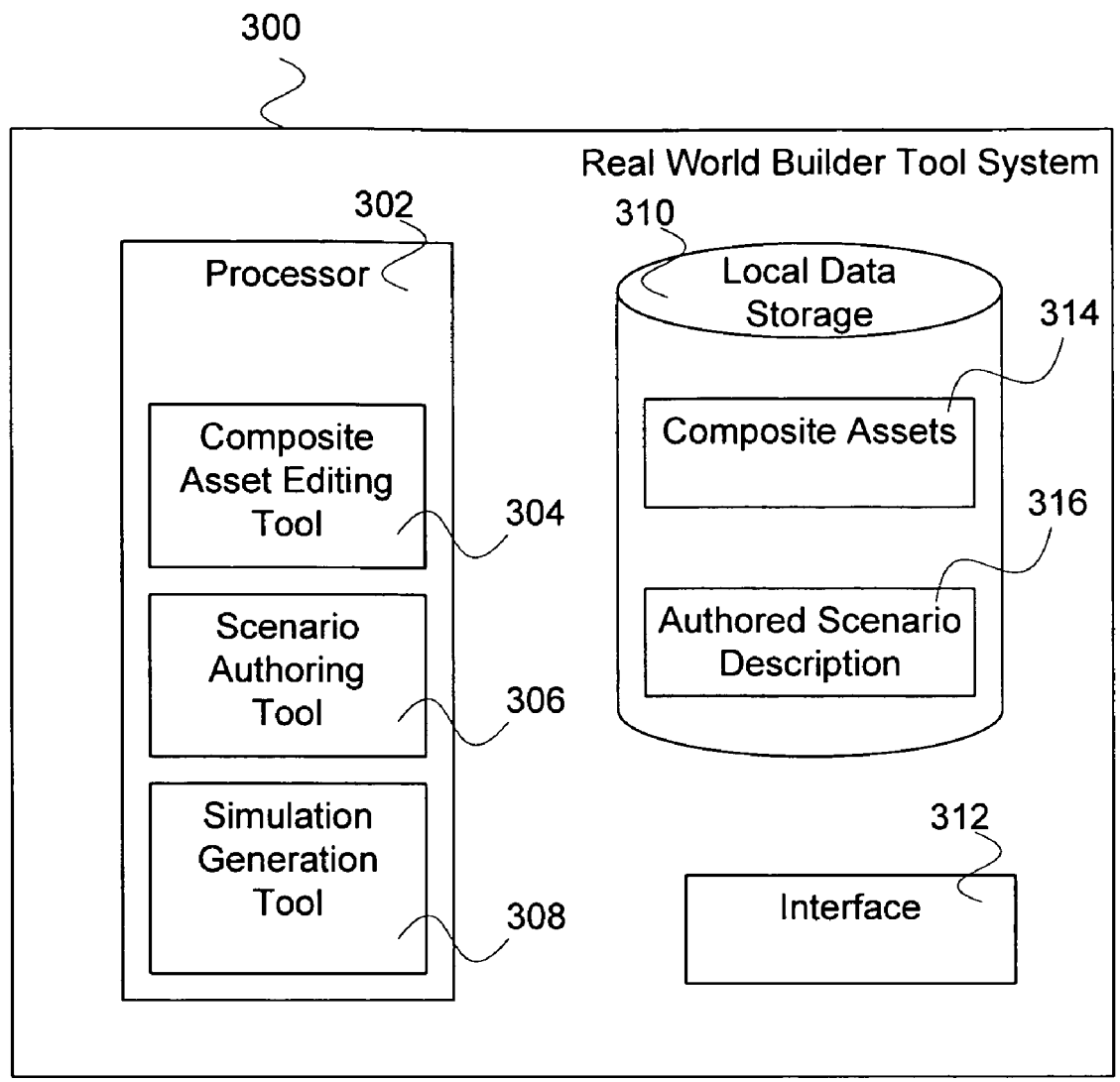
FIG. 3A is a block diagram illustrating an embodiment of a Real World Builder Tool System.

FIG. 3A is a block diagram illustrating an embodiment of a Real World Builder Tool System. In some embodiments, Real World Builder Tool System 300 is used to implement Real World Builder Tool System 100 of FIG. 1. In the example shown, Real World Builder Tool System 300 comprises Processor 302, Local Data Storage 310 and Interface 312. Processor 302 supports Composite Asset Editor tool 304, Scenario Authoring Tool 306, and Simulation Generation Tool 308. Composite Asset Editor 304 creates a composite asset based at least in part on one or more simulation specific assets. Scenario Authoring Tool 306 edits or incorporates composite asset(s) based at least in part on an input scenario description. In various embodiments, Scenario Authoring Tool 306 adds behaviors (e.g., the way an asset acts) or defines properties of (e.g., fixed or unchanging attributes of an asset) or parameters for (e.g., changeable attributes for an asset) assets. The behaviors, properties, and/or parameters can be algorithmically generated annotations to assets or user indicated annotations to assets. Simulation Generation Tool 308 generates the scenario simulation assets for a simulator based at least in part on the edited composite asset. In some embodiments, scenario simulation asset generator generates a complete simulation package that is deployable to a simulation host that includes executable code. The simulation package also includes asset(s) tailored for the simulation. Local Data Storage 310 stores Composite Assets 314 for use during scenario authoring and Authored Scenario Description 316. Authored Scenario Description 316 is used to generate scenario simulation packages. Real World Builder Tool System 300 communicates with one or more content management system (e.g., Content Management Systems 110 of FIG. 1) through Interface 312. In some embodiments, real world builder tool system 300 generates and outputs the one or more simulation systems. In some embodiments, Real World Builder Tool System 300 communicates with one or more simulation systems (e.g., deployable simulation systems 130 of FIG. 1) through interface 312.

In some embodiments, Composite Assets 314 are available as input for Real World Builder Tool System 300 for other scenarios. In some embodiments, authored scenario descriptions can be reused to generate simulation systems at another time.

Figure 3B:
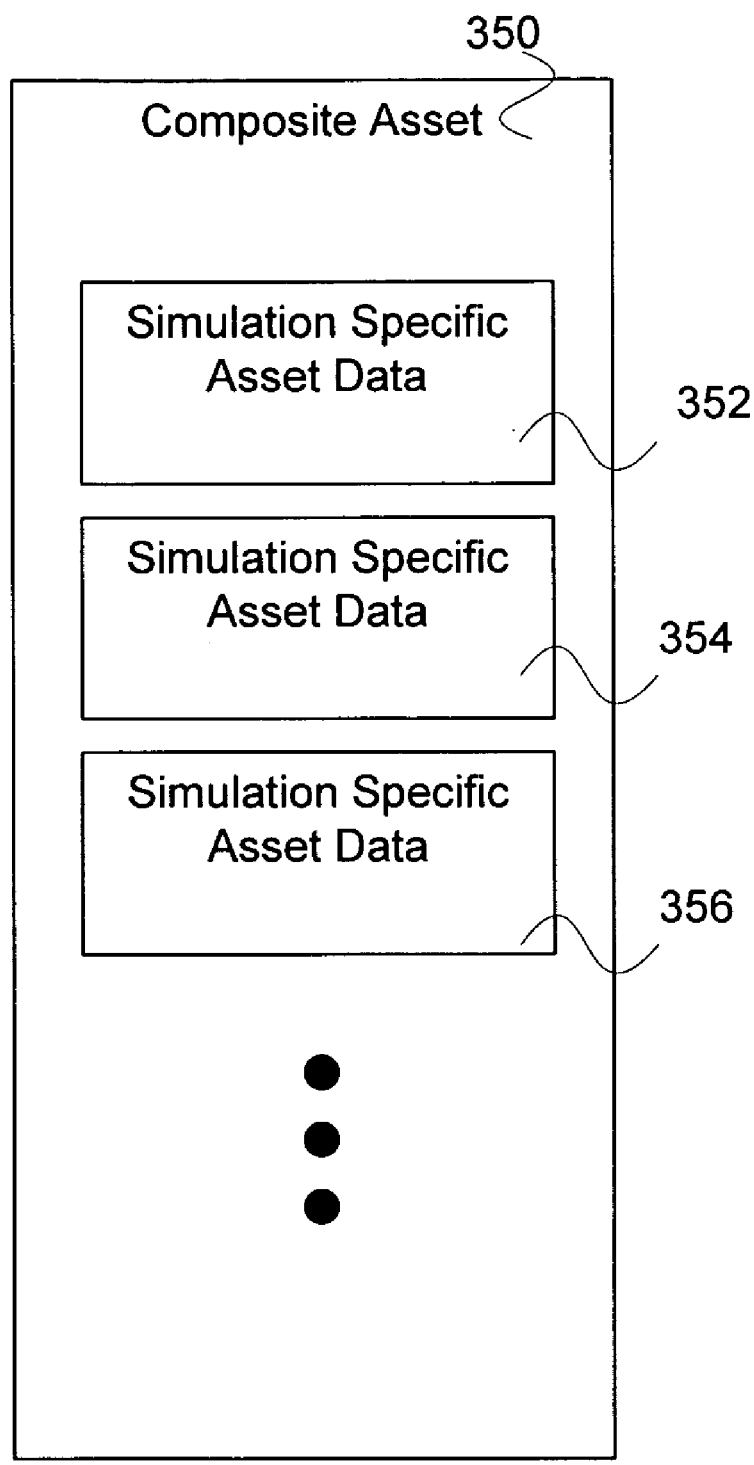
FIG. 3B is a block diagram illustrating an embodiment of a composite asset.

FIG. 3B is a block diagram illustrating an embodiment of a composite asset. In some embodiments, composite asset 350 is generated by composite asset editor 304 of FIG. 3A and stored in local data storage 310 of FIG. 3A and/or in Content Management Systems 110. Composite Asset 350 comprises data for one or more simulation elements for one or more simulation types. Data for an asset for a single simulation type is represented by Simulation Specific Asset Data 352, Simulation Specific Asset Data 354, and Simulation Specific Asset Data 356 in FIG. 3B. Each set of simulation specific asset data comprises data for a given asset and simulation type. In some embodiments, each set of simulation specific asset data in a given composite asset comprises data for the same element but for different simulation types than another set of simulation specific asset data. A composite asset such as Composite Asset 350 enables a single scenario authoring tool (e.g., such as Scenario Authoring Tool 306 of FIG. 3) to tailor the different simulation specific assets associated with a single composite asset to a given scenario in a unified and consistent manner. For example, a truck composite asset is modified (e.g., made the color pink) once by a scenario authoring tool so that it appears appropriately by foot personnel, from the air (e.g., a helicopter), or any other simulation that is part of the scenario. This makes the authoring less error prone and less tedious as compared to addressing each simulation specific asset separately.

Figure 4:
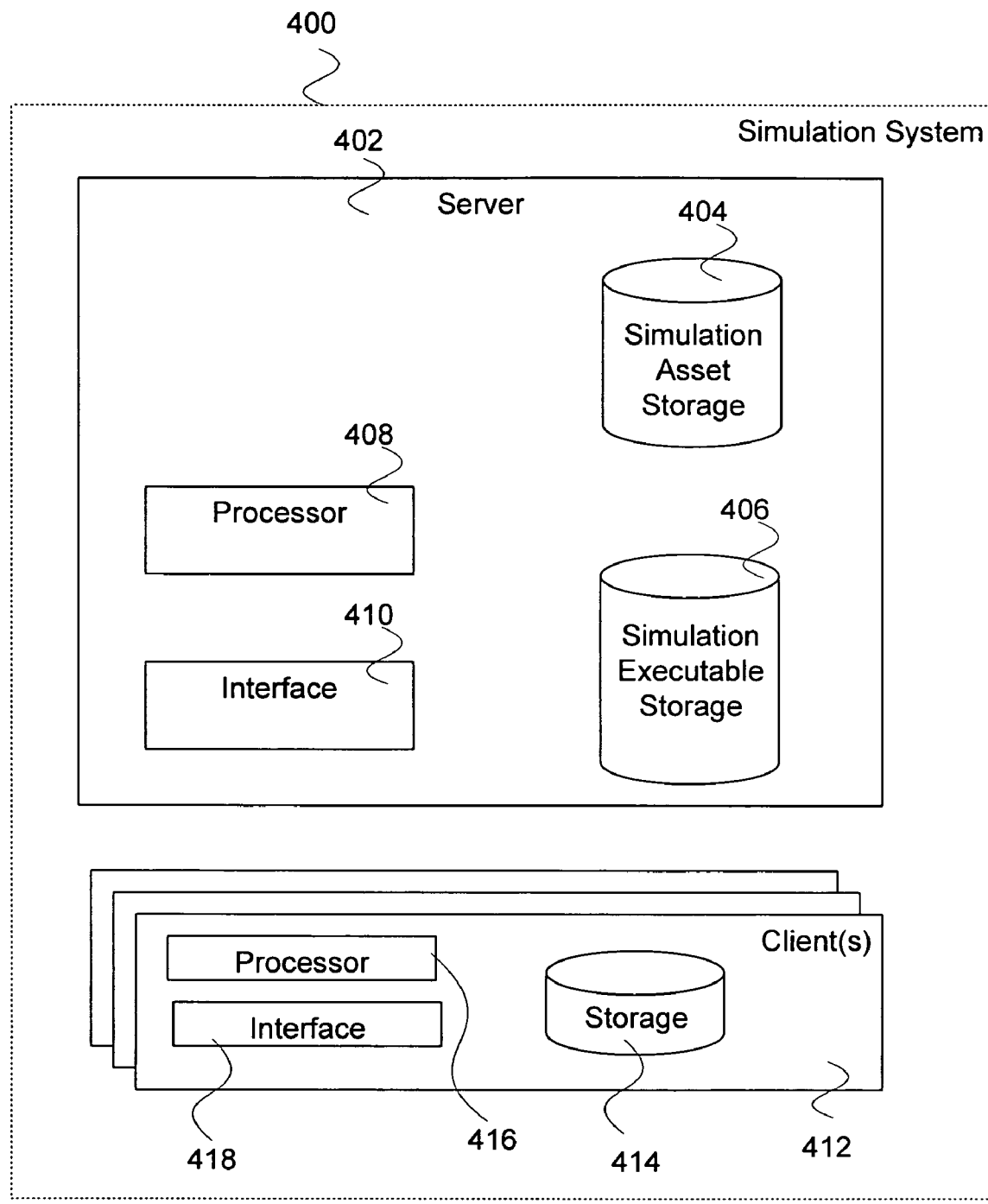
FIG. 4 is a block diagram illustrating an embodiment of a simulation system.

FIG. 4 is a block diagram illustrating an embodiment of a simulation system. In some embodiments, Simulation System 400 is used to implement one of one or more Deployable Simulation Systems 130 of FIG. 1. In the example shown, Simulation System 400 comprises Server 402 and one or more Clients 412. Server 402 comprises Simulation Asset Storage 404, Simulation Executable Storage 406, Processor 408, and Interface 410. In some embodiments, simulation assets stored in Simulation Asset Storage 404 are generated by Simulation Generation Tool 308 of FIG. 3A. Server 402 communicates with a Real World Builder (e.g., Real World Builder Tool System 100 of FIG. 1) through Interface 410. Simulation Executable Storage 406 stores simulation executable code that is executed on Processor 408. Simulation executable code stored in simulation Executable Storage 406 is executed in conjunction with simulation assets stored in Simulation Asset Storage 404. One or more Clients 412 comprise Local Storage 414, Processor 416, and Interface 418. A simulation user interacts with one of the one or more Clients 412 in order to use the simulation. When the simulation user makes a request to one of the one or more Clients 412 for the simulation to be run, one of the one or more Clients 412 communicates the request to Server 402 via Interface 418 and Interface 410. The simulation is executed concurrently on all simulation systems 120 and communicated back to the users. In various embodiments, aspects of the simulation are entirely executed on server 402, entirely executed on client 412, or downloaded and completely executed on client 412 with coordinating communication handled by server 402 so that multiple users are able to interact with a single simulation running on clients 412.

Figure 5:
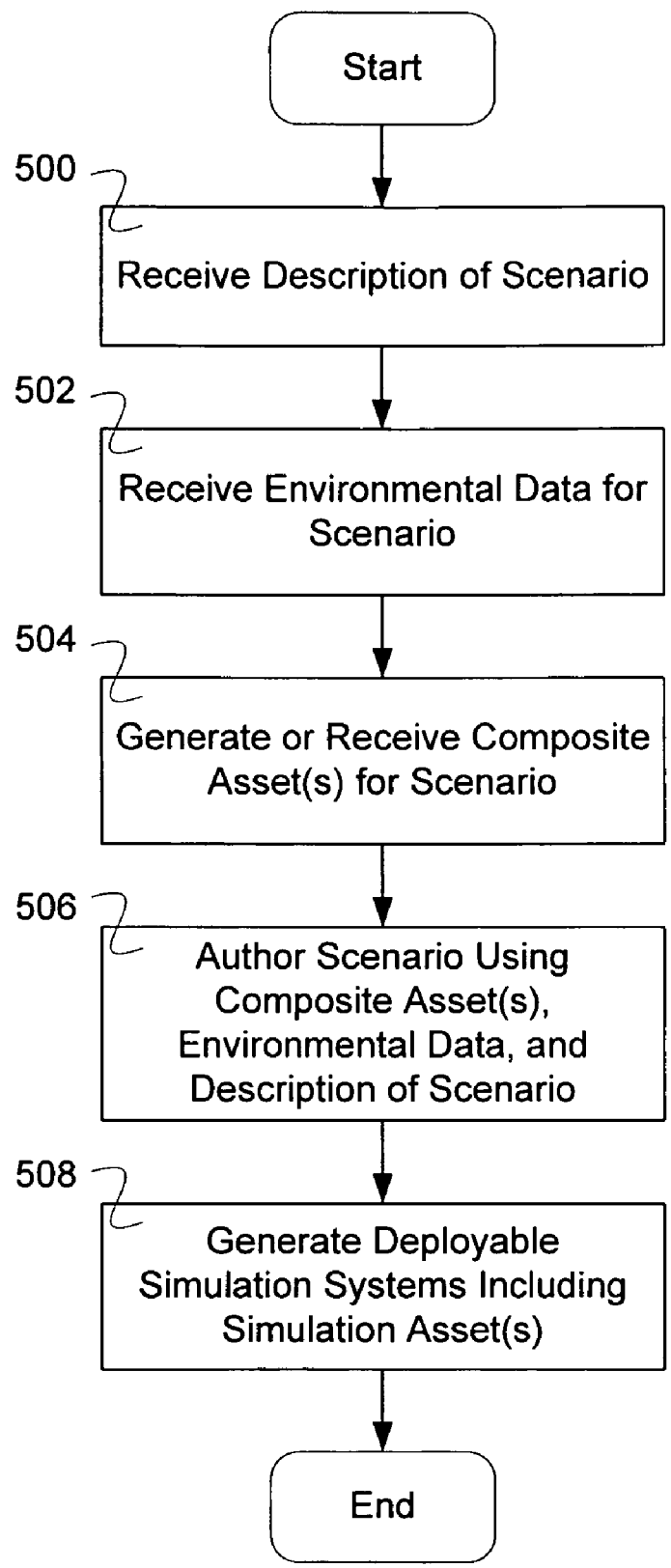
FIG. 5 is a flow diagram illustrating an embodiment of a process for real world building.

FIG. 5 is a flow diagram illustrating an embodiment of a process for real world building. In some embodiments, the process of FIG. 5 is executed by Real World Builder Tool system 300 of FIG. 3. In the example shown, in 500, a description of a scenario is received. In some embodiments, the real world building process begins with the reception of a description of the desired scenario. The scenario description comprises instructions for combining the one or more assets and environmental data into a scenario. For example, a scenario description includes one or more locations, a time frame, actor(s), context, one or more goals, available resources or any other appropriate descriptors for a scenario. In some embodiments, a scenario description may include an 'Operation Order,' which is a human readable description of a scenario.

In 502, environmental data are received for the scenario. Examples of environmental data include elevation data, reconnaissance photography and other data, cultural feature data (e.g., a building, a fountain, a park, etc.), geospatial annotation data (e.g., description of a feature), land use/land cover data (e.g., agricultural use, forest, asphalt, etc.), vector data (e.g., roads, waterways, rail lines), celestial mechanics, meteorological data, situational intelligence, or any other appropriate data regarding the environment for a scenario.

In 504, composite asset(s) are generated or received for the scenario. Composite assets are generated by associating one or more simulation specific assets together to create a composite asset. In various embodiments, simulation specific assets comprise a single asset, multiple distinct assets, or one or more distinct assets described from multiple perspectives. Examples of assets include a truck, a person, a crowd (of people), a building, a weapon, an aircraft, a helicopter, a tank, or any other appropriate object that can be present in a simulation. In some embodiments, after composite assets are generated, they are stored in a repository so that they can be reused by another scenario.

In 506, the scenario is authored using the composite asset(s), the environmental data, and the scenario description. Authoring includes processing environmental data and annotating/editing composite assets to include scenario specific information. Environmental data is processed to include multi-simulation behaviors, properties, and parameters, so that the environmental data can be used to generate simulation specific environmental data. The environmental data includes codes or tags for identifying the appropriate composite asset to use for creating the simulated environmental. In some embodiments, the environmental data's composite assets include full featured visual textures, sounds, underlayment, models such as power poles or mail boxes, visual effects e.g. steam or ocean spray, point or route annotation. In some embodiments, environmental data do not include sufficient information for different scenarios and individual simulation specific environmental data is required as input, and these individual simulation specific environmental data are later combined to create an environmental composite asset, which is annotated/edited as appropriate for a scenario and used to generate scenario specific simulation packages. The composite asset(s) and environmental data are annotated/edited to include scenario specific information and configuration. Scenario information is also prepared for specific simulation systems so that each simulation will appropriately be tailored for the scenario. In some embodiments, the package of information prepared for assisting in generating the specific simulation systems is stored as an authored scenario description. The stored authored scenario description can be reused at a later date to (re)generate simulation systems, if desired.

In 508, one or more deployable simulation systems are generated including simulation asset(s). The one or more deployable simulation systems reflect the common scenario. In some embodiments, the composite assets are deconstructed and assets specific to the scenario simulation are produced. In some embodiments, a simulation system package is generated including executable code and composite assets that are specifically optimized for the simulation system to run the scenario.

Figure 6:
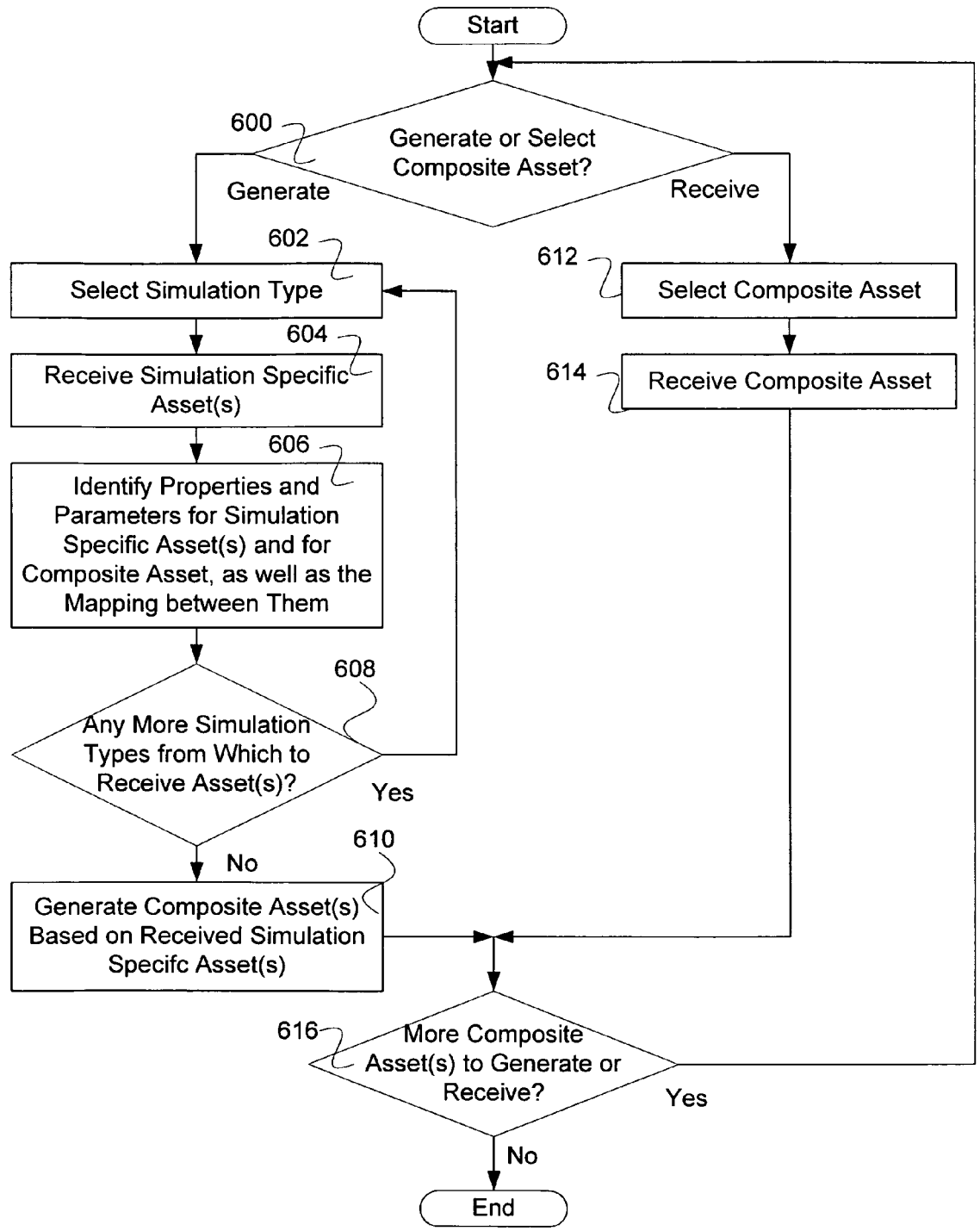
FIG. 6 is a flow diagram illustrating an embodiment of a process for receiving or generating composite assets for use in scenario authoring.

FIG. 6 is a flow diagram illustrating an embodiment of a process for receiving or generating composite assets for use in scenario authoring. In some embodiments, the process of FIG. 6 implements 504 of FIG. 5. In 600, it is determined whether a composite asset is to be selected or generated. In the event that a composite asset is to be selected, in 612 a composite asset is selected. In 614, the selected composite asset is received, and control passes to 616. In various embodiments, the composite asset may represent people, crowds (of people), objects such as vehicles, sensor instruments, behaviors, buildings and walls, terrain types, or any other appropriate scenario element.

In the event that a composite asset is to be generated, in 602, a simulation type is selected. In some embodiments, the real world builder maintains a list of available simulation types. In various embodiments, simulation types include a ground combat simulation (e.g., including movement or combat at ground level), a human face and expression simulation (e.g., including micro expression such as a deception detection simulation for training), an air simulation (e.g., a front end and/or back end helicopter simulation or an airplane simulation such as an A10), an electronic warfare simulation (e.g., radar, radio, signal jamming instrumentation simulation for an integrated air defense system), a hospital logistics simulation (e.g., including building level logistics simulation), a maritime simulation with watercraft (ships, submarines, small boats, ocean/water currents), a command and control simulation with situational overview, or any other appropriate simulation type. In 604, a simulation specific asset or assets are received. In various embodiments, simulation specific assets include truck assets, person assets, building assets, or any other appropriate type of assets. In 606, properties and parameters of the simulation specific asset(s) and for the composite asset are identified, as well as the mapping between them. Asset properties are directly modifiable operating parameters, for example mass or the starting location of an airplane, the maximum speed or minimum turning radius of a truck, or any other appropriate type of asset property. Asset parameters are modifiable abstract characteristics of an asset. In some embodiments, asset parameters are used to indirectly customize an asset for a given scenario, for example preloading the temperature of an asset effects affects its derived infrared signature. In some embodiments, composite asset properties and parameters are used to share information between the various simulation systems, for example specific markings that would be visible in multiple simulation clients, or unique identifier(s) for use by standard interoperability protocols.

In 608, the process determines if there are any more simulation types from which to receive additional asset or assets for incorporation in the composite asset. If there are more simulation types from which to receive assets, control passes to 602 and the steps repeat. If there are no more simulation types from which to receive assets, control passes to 610. In 610, a composite asset are generated based on the received simulation specific asset(s), and control passes to 616. Assets received for each simulation type are combined into a single composite asset, containing information necessary to integrate the asset into a specific scenario for each of the different types of simulations. In some embodiments the process may yield multiple composite assets, each composite asset optimized for specific uses.

In 616, it is determined if there are more composite asset(s) to generate or receive. If there are more composite asset(s) to generate or receive, then control passes to 600. If there are no more composite assets to generate or receive, then the process ends.

Figure 7:
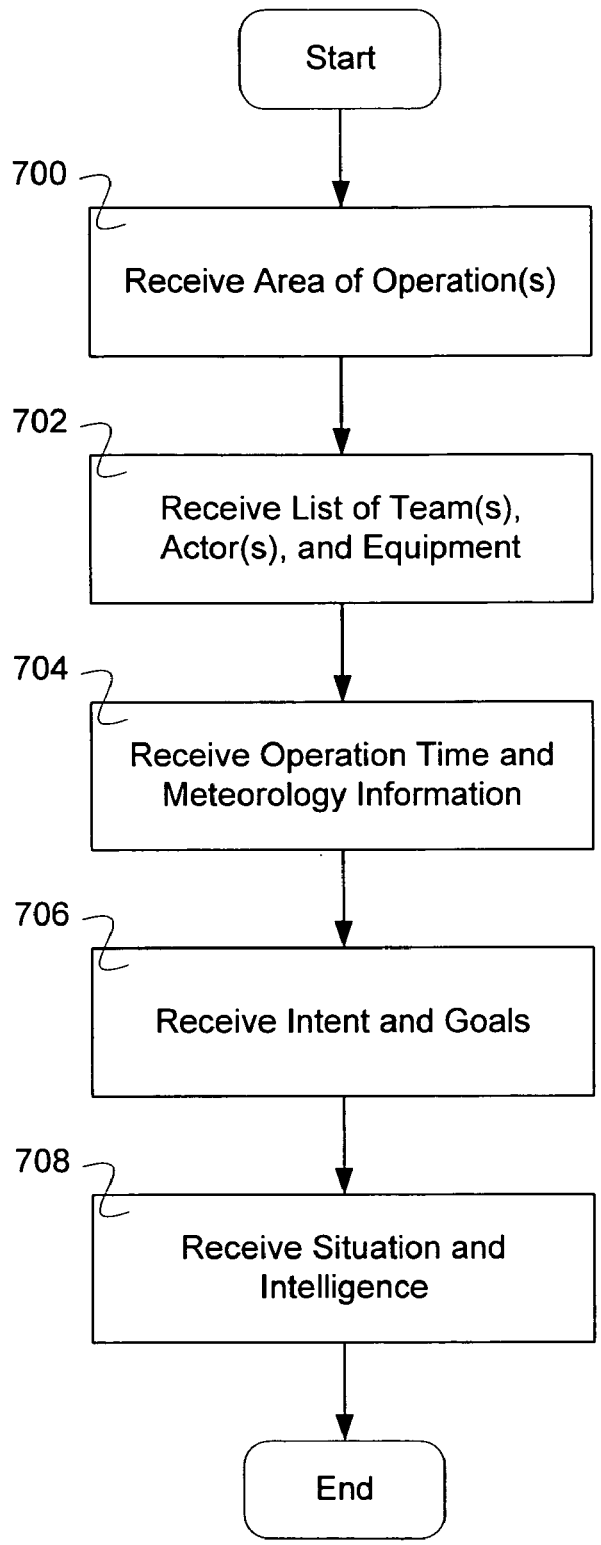
FIG. 7 is a flow diagram illustrating an embodiment of a process for receiving a scenario description.

FIG. 7 is a flow diagram illustrating an embodiment of a process for receiving a scenario description. In some embodiments, the process of FIG. 7 implements 500 of FIG. 5. In 700, the area of operation(s) is/are received. The area of operation comprises the scenario location information. In various embodiments, the area of operation is a small region such as a few blocks, a large region that is many square kilometers, the entire planet, a range of the electromagnetic spectrum, or any other appropriate operation area. In 702, a list of team(s), actor(s) and equipment are received. Actors include people on the ground, people operating vehicles (e.g., a vehicle operating on the ground, in the air, or in the water), people and vehicles controlled by software scripts or artificial intelligence, or any other appropriate entities. Equipment includes sensors, weapons, or any other appropriate equipment. In various embodiments, the list of actors and equipment is provided as a simple list, as a fully developed force plan, an abstracted list is abstracted with the expectation that the receiver can expand the team to the individual simulation actors and equipment, or for simulation systems that model groups use without expansion, or in other appropriate manner. In 704, the operation time and meteorology information are received. For example, operation time and meteorologic information may include local time of day, time zone, weather conditions, celestial mechanics for phase and path of moon, or any other appropriate time and meteorological data.

In 706, goals and objectives are received. The goals and objective provide an individual actor with guidance and mission performance criteria. In 708, situation and intelligence are received. In some embodiments, situation and intelligence are not received. Situation and intelligence provide more guidance to the author regarding the situation—for example, cultural context information, or information from reconnaissance.

Figure 8:
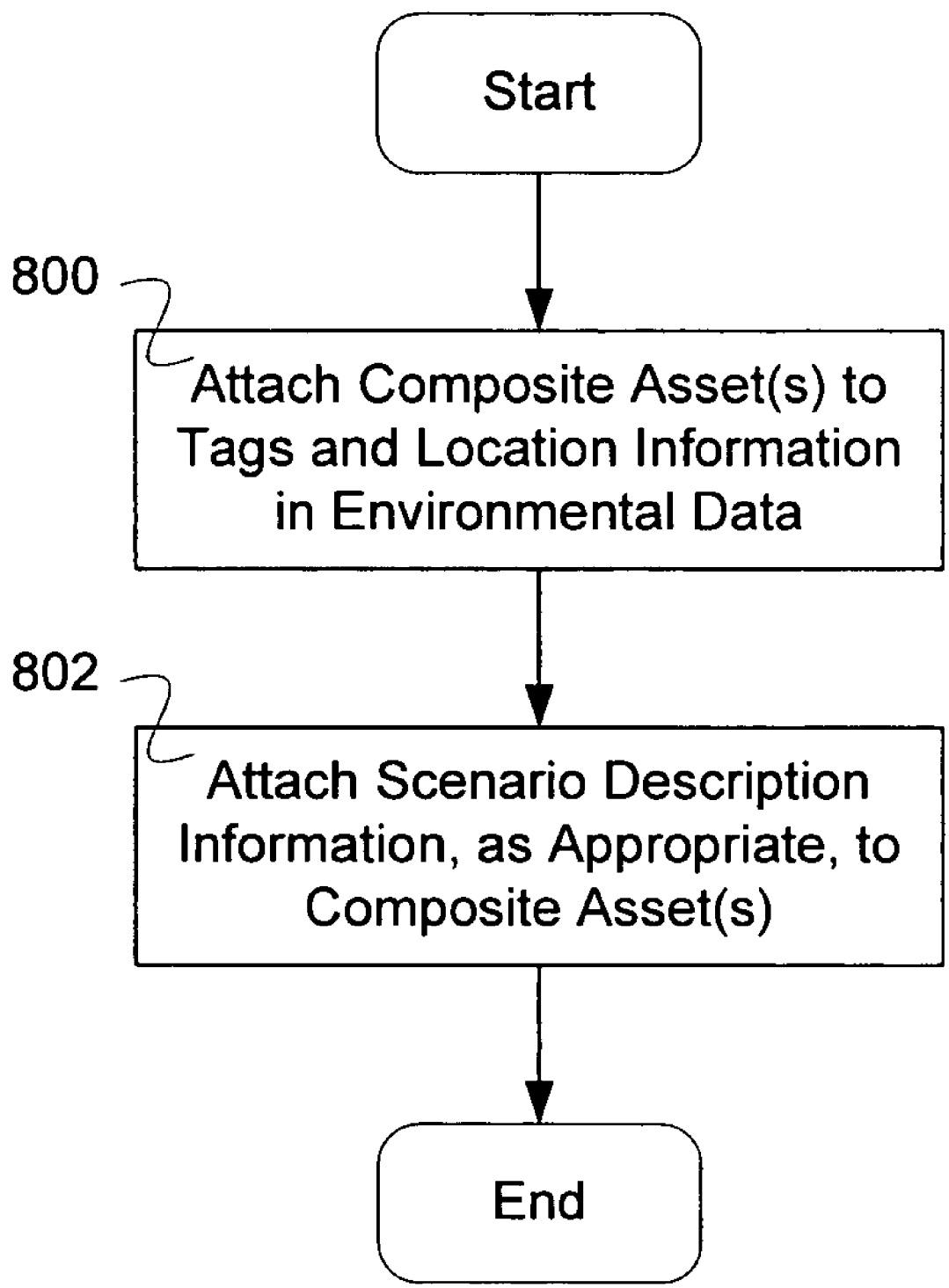
FIG. 8 is a flow diagram illustrating an embodiment of a process for authoring a scenario using the composite asset(s), the environmental data, and the scenario description.

FIG. 8 is a flow diagram illustrating an embodiment of a process for authoring a scenario using the composite asset(s), the environmental data, and the scenario description. In some embodiments, the process of FIG. 8 implements 506 of FIG. 5. In the example shown, in 800, composite asset(s) are attached to tags and local information in environmental data. Some or all of the environmental data (e.g., environmental data such as is received in 502 of FIG. 5) is used to build the scenario. The environmental data can be considered a "sand box" in which other scenario actors or objects—assets—are placed. Composite asset(s) that represent the cultural features, land use, cultural hinting or other aspects of the terrain are matched to environmental data. Any composite assets (e.g., composite assets such as those generated or received in 504 of FIG. 5) are available for use with the environmental data. In some embodiments, the composite assets referenced by the environmental data may include information for things like water, concrete or fire hydrants. In 802, scenario description information is attached, as appropriate, to composite assets. For example, composite assets may be augmented by setting the value of an asset parameter, such as building height, coefficient of friction, or thermal level. In some embodiments, the composite asset informed environmental data is made available to be used or reused by the real world builder by inclusion in an authored scenario description.

Figure 9:
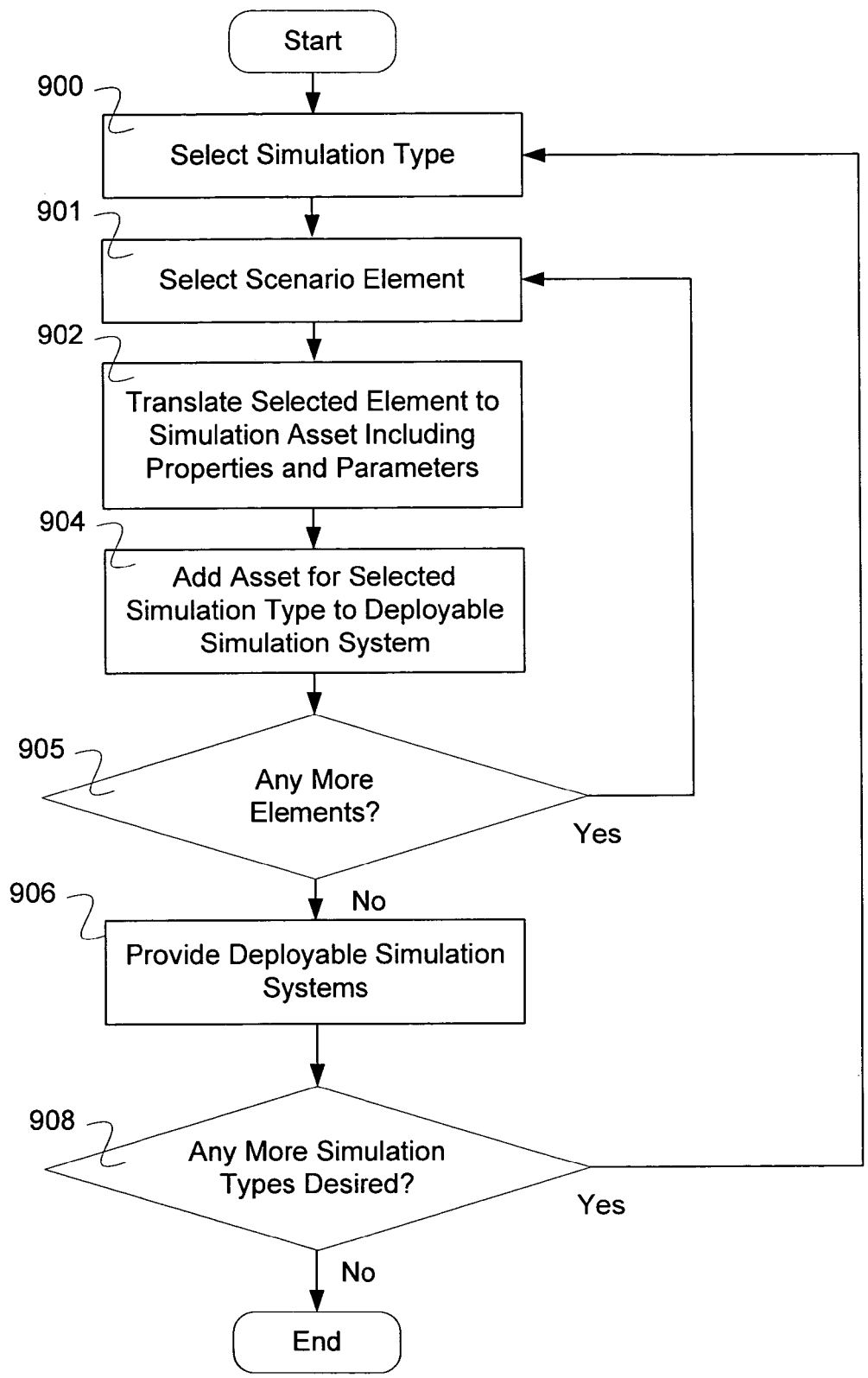
FIG. 9 is a flow diagram illustrating an embodiment of a process for generating one or more simulation systems.

FIG. 9 is a flow diagram illustrating an embodiment of a process for generating one or more simulation systems. In some embodiments, the process of FIG. 9 implements 508 of FIG. 5. In the example shown, in 900, a simulation type is selected. The simulation type is one of the one or more simulation types that is/are part of the scenario. In 901, a scenario element is selected. A scenario element comprises any given piece of scenario information. In 902, selected element is translated to simulation asset including properties and parameters. The selected element (e.g., composite asset(s) and/or other scenario information such as environmental data) is translated to be a simulation asset for a selected simulation type including zero or more properties and parameters of the element that have scenario specific information as edited/annotated by authoring. Simulation assets are assets designed specifically for a given simulation type. Example Simulation types include air, ground, cultural, electronic, command and control, training, or regional. In some embodiments, simulation asset properties and parameters are updated to reflect the corresponding composite asset properties and parameters. In 904, asset for selected simulation type is added to deployable simulation system. For example, a composite asset is translated to a deployable simulation asset, and the translated assets with scenario derived parameters and properties values are collected as part of a simulation system. In 905, it is determined whether there are any more elements. If there are more elements, processing continues by passing control to 901. If there are no more elements to process, then control passes to 906. In 906, deployable simulation systems are provided. In 908, it is determined whether there are more simulation types desired. If there are more simulations desired, then control passes to 900. If there are no more simulations desired, then the process ends.

In some embodiments, the deployable simulation systems are generated including the executable code appropriate to the simulation. The resulting set of simulation systems all can share the scenario as authored, independent of their specific simulation perspective.

In some embodiments, deployable simulation systems are generated using an authored simulation description. The authored simulation description provide authored/edited/annotated composite asset(s), environmental data, and scenario description sufficient for generating and providing one or more deployable simulation systems for the scenario.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a simulation asset, comprising:
    receiving a composite asset, wherein the composite asset comprises a plurality of data sets, wherein each of the data sets comprises data specifically for one of a plurality of different simulation systems that each simulates a scenario from a different perspective, wherein the data sets each comprise data for a same scenario element; and
    generating a simulation asset based at least in part on one of the data sets of the composite asset, said simulation asset tailored for simulating said same scenario element on one of the simulation systems;
    wherein the method is performed by one or more processor devices.

2. A method as in claim 1, further comprising storing the composite asset in a computer readable medium.

3. A method as in claim 1, wherein said receiving the composite asset comprises:
    receiving environmental data, the environmental data including codes or tags that each identifies one of a plurality of composite assets and associates the composite asset with local information in the environmental data, wherein the environmental data comprises one of the following: elevation data, reconnaissance photography, cultural feature data, geospatial annotation data, land use data, land cover data, celestial mechanics, meteorological data, or situational intelligence; and
    identifying one of the composite assets from one of the codes or tags.

4. A method as in claim 1, wherein said generating includes associating a parameter of the composite asset with the simulation asset.

5. A method as in claim 1, wherein said generating includes associating a property of the composite asset with the simulation asset.

6. A method as in claim 1, further comprising sending the simulation asset to one of the simulation systems to simulate said same scenario element.

7. A method as in claim 1, further comprising:
    generating a first simulation asset based at least in part on a first one of the data sets of the composite asset, the first simulation asset being tailored for simulating said same scenario element on a first one of the simulation systems;
    generating a second simulation asset based at least in part on a second one of the data sets of the composite asset, the second simulation asset being tailored for simulating said same scenario element on a second one of the simulation systems;
    sending the first simulation asset to the first simulation system, for the first simulation system to simulate said same scenario element from a first perspective; and
    sending the second simulation asset to the second simulation system, for the second simulation system to simulate said same scenario element from a second perspective that is different than the first perspective.

8. A method as in claim 7, wherein the first and second simulation systems simultaneously simulate said same scenario element from their respective first and second perspectives.

9. A method as in claim 7, wherein the first and second simulation systems communicate information between each other while executing.

10. A method as in claim 1, wherein the scenario comprises one or more of the following: a military mission, a hostage rescue, an assault on a building, an invasion of a port, an emergency situation, a disaster situation, a flood situation, a hurricane situation, an earthquake situation, and a fire situation.

11. A method as in claim 1, wherein the simulation comprises one of the following: a ground combat simulation, a human face and expression simulation, a deception detection simulation, a fixed wing aircraft simulation, a rotary wing aircraft simulation, an instrumentation simulation, a maritime simulation, a hospital logistics simulation, a medical process simulation, or a medical procedure simulation.

12. A method as in claim 1, wherein the same scenario element comprises one of the following: a truck, a person, a building, a weapon, an aircraft, a helicopter, a grassy terrain representation, or a tank.

13. A method as in claim 1, further comprising attaching a description element for a scenario to the composite asset, wherein the description element comprises one of the following: an area of operation, a list of teams, a list of actors, a team, an actor, a piece of equipment, an operation time, a piece of meteorology information, a scenario intent, a scenario goal, a scenario situation, or a piece of scenario intelligence.

14. A system for generating a scenario simulation asset, comprising:
 a scenario authoring tool configured to receive a composite asset, wherein the composite asset comprises a plurality of data sets, and wherein each of the data sets comprises data specifically for one of a plurality of different simulation systems that each simulates a scenario from a different perspective, wherein the data sets each comprise data for a same scenario element; and
 a simulation generation tool, wherein the simulation generation tool generates a simulation asset based at least in part on one of the data sets of the composite asset, said simulation asset tailored for simulating said same scenario element on one of the simulation systems; and
 one or more processor devices configured to implement the scenario authoring tool and the simulation generation tool.

15. A computer program product for generating a scenario simulation asset, the computer program product being embodied in a computer readable medium and comprising computer instructions for:
 receiving a composite asset, wherein the composite asset comprises a plurality of data sets, wherein each of the data sets comprises data specifically for one of a plurality of different simulation systems, wherein each of the simulation systems simulates a scenario from a different perspective, wherein the data sets each comprise data for a same scenario element; and
 generating a simulation asset based at least in part on one of the data sets of the composite asset, said simulation asset tailored for simulating said same scenario element on one of the simulation systems.

16. A computer program product as in claim 15, wherein receiving the composite asset comprises:
 receiving environmental data, the environmental data including codes or tags that each identifies one of a plurality of composite assets and associates the composite asset with local information in the environmental data, wherein the environmental data comprises one of the following: elevation data, reconnaissance photography, cultural feature data, geospatial annotation data, land use data, land cover data, celestial mechanics, meteorological data, or situational intelligence; and
 identifying one of the plurality of composite assets from one of the codes or tags.

17. A computer program product as in claim 15, wherein different perspectives comprise different levels of detail.

18. A method as in claim 1, wherein different perspectives comprise different levels of detail.

19. A method as in claim 6, wherein at least one of the simulation systems comprises a server configured to interact with a plurality of clients.

20. A system as in claim 14, wherein the scenario authoring tool is further configured to:
 receive environmental data, the environmental data including codes or tags that each identifies one of a plurality of composite assets and associates the composite asset with local information in the environmental data, wherein the environmental data comprises one of the following: elevation data, reconnaissance photography, cultural feature data, geospatial annotation data, land use data, land cover data, celestial mechanics, meteorological data, or situational intelligence; and
 identify one of the composite assets from one of the codes or tags.

21. A system as in claim 14, wherein different perspectives comprise different levels of detail.

* * * * *

UNITED STATES PATENT AND TRADEMARK OFFICE
CERTIFICATE OF CORRECTION

PATENT NO. : 8,010,327 B2  
APPLICATION NO. : 12/150323  
DATED : August 30, 2011  
INVENTOR(S) : Keith Copenhagen et al.

Page 1 of 1

It is certified that error appears in the above-identified patent and that said Letters Patent is hereby corrected as shown below:

At column 1, line 3, before "BACKGROUND OF THE INVENTION" please add

--STATEMENT REGARDING FEDERALLY SPONSORED R&D

This invention was made with government support under Government Contract

HR0011-06-9-0004 awarded by DARPA. The government has certain rights in the invention.--.

Signed and Sealed this
Twenty-ninth Day of May, 2012

David J. Kappos
*Director of the United States Patent and Trademark Office*